(12) United States Patent
Denda et al.

(10) Patent No.: US 7,266,724 B2
(45) Date of Patent: Sep. 4, 2007

(54) APPARATUS AND METHOD FOR INTERRUPTION OF READ AND WRITE OPERATION AND PROGRAM STORAGE MEDIUM FOR STORING READ AND WRITE PROCEDURE PROGRAM

(75) Inventors: Akihiro Denda, Saitama-ken (JP); Yoshiya Nonaka, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 547 days.

(21) Appl. No.: 10/058,790

(22) Filed: Jan. 30, 2002

(65) Prior Publication Data

US 2002/0101772 A1   Aug. 1, 2002

(30) Foreign Application Priority Data

Jan. 30, 2001   (JP)  ............................... 2001-21802

(51) Int. Cl.
*G06F 11/00*   (2006.01)
*G11B 15/02*   (2006.01)

(52) U.S. Cl. ................. 714/24; 369/30.23; 714/763

(58) Field of Classification Search ............ 369/30.36, 369/30.23, 47.32, 30.26, 47.23, 59.24; 714/24; G11B 15/02, 5/09, 20/10, 20/14, 27/36, 15/05; G06F 11/00

See application file for complete search history.

(56) References Cited

U.S. PATENT DOCUMENTS

| | | | | |
|---|---|---|---|---|
| 4,458,307 A | * | 7/1984 | McAnlis et al. | 714/22 |
| 4,855,754 A | * | 8/1989 | Tanaka et al. | 346/17 |
| 5,193,176 A | * | 3/1993 | Brandin | 714/14 |
| 5,831,946 A | * | 11/1998 | De Bie | 369/30.36 |
| 6,493,299 B2 | * | 12/2002 | Sato | 369/47.12 |
| 6,553,532 B1 | * | 4/2003 | Aoki | 714/763 |
| 6,631,101 B1 | * | 10/2003 | Chan et al. | 369/30.36 |

FOREIGN PATENT DOCUMENTS

| | | |
|---|---|---|
| EP | 0 338 839 A2 | 10/1989 |
| EP | 0 560 600 A2 | 9/1993 |
| EP | 0 997 900 A2 | 5/2000 |
| JP | 11-1167787 | * 6/1999 |

OTHER PUBLICATIONS

MAT (Machine assisted translation) of JP 11-167787.*
Abstract Only of JP 61 013328, Y. Noboru, "Accessing System Of Data File", Jan. 21, 1986.

(Continued)

*Primary Examiner*—A M Psitos
(74) *Attorney, Agent, or Firm*—Arent Fox LLP (57) ABSTRACT

A method and an apparatus for performing high-quality read and write operations through a simple operation without being affected by an interruption even when the interruption has occurred in the course of a read/write operation between information storage media. When an interruption occurs in the course of reading program information stored on an optical disc to write the program information onto a hard disk, the write status of the program information which has encountered the interruption and the information for identifying the program information are stored on the hard disk. After the recovery from the interruption, read and write operations are restarted. Then, the program information capable of ensuring the continuity with the program information which has been properly written on the hard disk prior to the interruption is determined in accordance with the write status of the program information which has encountered the interruption and the information for identifying the program information. A read operation is performed from the program information thus determined and then a write operation to write the information on the hard disk.

9 Claims, 4 Drawing Sheets

OTHER PUBLICATIONS

Abstract Only of JP 11 167787, H. Yoshiaki, "Recording & Reproducing Device", Jun. 22, 1999.

Abstract Only of JP 06 325473, H. Minoru, "Recording & Reproducing Device", Nov. 25, 1994.

* cited by examiner

APPARATUS AND METHOD FOR INTERRUPTION OF READ AND WRITE OPERATION AND PROGRAM STORAGE MEDIUM FOR STORING READ AND WRITE PROCEDURE PROGRAM

BACKGROUND OF THE INVENTION

The present invention relates to an information read/write apparatus, an information read/write method, and a program storage medium storing a read and write procedure program, which allow for reading information stored on a first information storage medium and writing the information on a second information storage medium. In particular, the present invention relates to such an information read/write apparatus, an information read/write method, and a program storage medium for storing a read and write procedure program which automatically perform appropriate read and write operations upon occurrence of an interruption in the course of a read or write operation.

For example, conventionally known is an information read/write apparatus, such as an audio device, which is adapted to read program information, such as audio data, stored on a CD (Compact Disc) or the like and write the information on an MD (Mini Disc) or the like.

However, suppose that read or write operation is interrupted due to power failure in the course of reading or writing program information. In this case, the conventional information read/write apparatus requires cumbersome manual operations in order to continuously restart a read or write operation with high accuracy after the recovery from the interruption.

For example, in case where the conventional information read/write apparatus is a car audio device which is mounted on a car, when a user (such as the driver) turns off the accessory switch (ACC switch) upon stopping the engine, the read or write operation of the information read/write apparatus is to be interrupted. Then, when the accessory switch (ACC switch) is turned on to start the engine after the interruption, the read operation is restarted from the program information at the time of the interruption. However, since the write operation has to be reset, the program information which is to be read after the interruption fails to be written any longer.

To restart reading and writing program information after such an interruption has occurred, the user may specify a write mode or the like. However, at the time of recovery from the interruption, the read operation continues to read the program information. Consequently, the restarted write operation only writes the program information intermittently, thereby making it impossible to write the program information with accuracy. This is why cumbersome manual operations were required for writing program information with accuracy.

First, a user or the like performs an operation for reading the program information which has been already stored in order to know the range of the program information which has been stored.

Then, when it is found that the most recently written program information at the time of the interruption has been read and written down to its end, the user performs an operation for specifying the track number of the program information which is to be read and written after the most recently written program information. The user also performs an operation for specifying the recording mode or the like in order to restart to read and write the program information from the specified track number.

When it is found that the most recently written program information at the time of the interruption has been written incompletely (not written down to its end), the user performs an operation for erasing the incompletely written program information. Then, the user performs an operation for specifying the track number of the incompletely written program information. Subsequently, the user performs an operation for specifying a recording mode or the like in order to restart reading and writing the program information from the program information of the specified track number.

As described above, it was necessary to perform the aforementioned cumbersome manual operations in order to continue accurate read and write operations of the program information subsequent to the most recently written program information at and after the time of an interruption caused such as by a power failure.

SUMMARY OF THE INVENTION

The present invention has been developed in view of these problems. It is therefore an object of the present invention to provide such an information read/write apparatus, an information read/write method, and a program storage medium for storing a read and write procedure program for allowing a computer to perform the read and write processing which requires only a simple operation to continue high-quality reading and writing operations of the program information subsequent to the most recently written program information at an interruption caused such as by a power failure which has happened in the course of the previous read/write operation.

To achieve the aforementioned object, an information read/write apparatus according to the present invention comprises: read device for reading one or more pieces of program information stored on a first information storage medium; write device for writing the program information read from the first information storage medium onto a second information storage medium; detector means for detecting an interruption of at least any one of a read operation of the read device and a write operation of the write device in the course of writing the program information by the write device; determination means for determining a write status of program information on the second information storage medium at the time of the interruption, when the detector means has detected the interruption; and control means for controlling the read device and the write device, upon restarting of writing the program information by the write device and in response to the write status determined by the determination means, to continue a write operation on the second information storage medium from the program information to be read subsequent to the program information at the time of the interruption or to perform a rewrite operation on the second information storage medium from the program information at the time of the interruption.

In addition, the detector means is characterized by detecting an interruption due to a power failure at least at any one of the read device or the write device.

Furthermore, the determination means is characterized by determining the write status of whether the program information at the time of the interruption has been written to its end or incompletely.

Furthermore, the control means is characterized by controlling and thereby allowing the write device to write information indicative of the write status determined by the determination means onto the second information storage medium.

Furthermore, when the determination means determines that the program information at the time of the interruption has been written to its end, the control means is characterized by allowing, upon continuing the write operation, the read device and the write device to continue a write operation on the second information storage medium from the program information to be read subsequent to the program information at the time of the interruption.

Furthermore, when the determination means determines that the program information at the time of the interruption has been written incompletely, the control means is characterized by allowing, upon performing the rewrite operation, the read device and the write device to erase the program information at the time of the interruption and having been already written on the second information storage medium, and rewrite, onto the second information storage medium, the program information corresponding to the erased program information of the program information stored on the first information storage medium.

The information read/write apparatus according to the present invention is adapted to have the configuration described above and operate as follows. That is, when the read device reads program information stored on a first information storage medium and an interruption has occurred due to a power failure or the like while the write device is writing the read program information on a second information storage medium, the write status of the program information is determined which has already been written before the interruption. After the interruption has been eliminated and a read/write operation has been instructed, it is determined in accordance with the determined write status whether the program information which initially had to be written has remained incomplete. The apparatus then allows the read device to automatically perform read operations from the program information, which has not yet been written, stored on the first information storage medium. The apparatus also allows the write device to subsequently write the program information (on which the read operation has been performed again) onto the second information storage medium.

That is, when it is determined that the program information at the time of the interruption has been written to its end, program information to be read subsequent to the program information at the time of the interruption is continuously written onto the second information storage medium. When it is determined that the program information encountered at the time of the interruption has been incomplete, the program information at the time of the interruption and having been already written on the second information storage medium is erased. A rewrite operation is performed on the second information storage medium from the program information corresponding to the erased program information of the program information stored on the first information storage medium.

This makes it possible to continue performing a read/write operation of the program information subsequent to the interruption without requiring cumbersome manual operations. This in turn serves to improve operability and provide high-quality read and write operations ensuring the continuity between the program information stored prior to the interruption and the program information stored subsequent to the interruption.

To achieve the aforementioned object, the present invention provides an information read/write method for reading one or more pieces of program information stored on a first information storage medium and writing the program information onto a second information storage medium. The method comprises: detecting the interruption of any one of the read operation or the write operation in the course of writing the program information onto the second information storage medium; determining a write status of program information on the second information storage medium at the time of the interruption when the interruption has been detected; and, upon restarting the write operation of the program information and in response to the write status determined, continuously performing a write operation on the second information storage medium from program information to be read subsequent to the program information at the time of the interruption or performing a rewrite operation on the second information storage medium from the program information at the time of the interruption.

On the other hand, determining the write status is to determine the write status of whether the program information at the time of the interruption has been written to its end or incompletely. When it is determined that the program information at the time of the interruption has been written to its end, the step of performing read and write operations in response to the write status continues a write operation on the second information storage medium from the program information to be read subsequent to the program information at the time of the interruption. When it is determined that the program information at the time of the interruption has been written incompletely, the step of performing read and write operations in response to the write status erases the program information at the time of the interruption, having been already written on the second information storage medium, and performs a rewrite operation on the second information storage medium from the program information corresponding to the erased program information of the program information stored on the first information storage medium.

According to the information read/write method, when program information stored on the first information storage medium is read and an interruption has occurred due to power failure or the like while the read program information is being written onto the second information storage medium, the write status of the program information is determined which has already been written before the interruption. After the interruption has been eliminated and read and write operations have been instructed, it is determined in accordance with the determined write status whether the program information that initially had to be written has remained incomplete. The method also allows for automatically performing read operations from the program information, which has not yet been written, stored on the first information storage medium. In addition to this, the method allows for subsequently writing the program information, on which the read operation has been performed again, onto the second information storage medium.

Then, when it is determined that the program information at the time of the interruption has been written to its end, the program information to be read subsequent to the program information at the time of the interruption is continuously written onto the second information storage medium. When it is determined that the program information at the time of the interruption has been written incompletely, the program information encountered at the time of the interruption and having been already written on the second information storage medium is erased. A rewrite operation is performed on the second information storage medium from the program information corresponding to the erased program information of the program information stored on the first information storage medium.

This makes it possible to continue read and write operations on the program information subsequent to the interruption without requiring cumbersome manual operations. This in turn serves to improve operability and provide high-quality read and write operations ensuring the continuity between the program information stored prior to the interruption and the program information stored subsequent to the interruption.

To achieve the aforementioned object, the present invention also provides a program storage medium for storing a read and write procedure program to allow a computer to perform read and write operations for reading one or more pieces of program information stored on a first information storage medium and writing the program information onto a second information storage medium. The read and write procedure program comprising the procedure steps of: detecting an interruption of any one of the read operation and the write operation; determining a write status of program information on the second information storage medium at the time of the interruption when the interruption has been detected; and, upon restarting the write operation and in response to the write status determined, continuously performing a write operation on the second information storage medium from program information to be read subsequent to the program information at the time of the interruption or performing a rewrite operation on the second information storage medium from the program information at the time of the interruption.

The program storage medium for storing a read and write procedure program may be loaded into a microcomputer-mounted electronic device, such as a personal computer, having an information read/write function to install the aforementioned read and write procedure program in the electronic device. The read and write procedure program can be executed in the aforementioned microcomputer, thereby providing the same function as that of a purpose-built information read/write apparatus.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
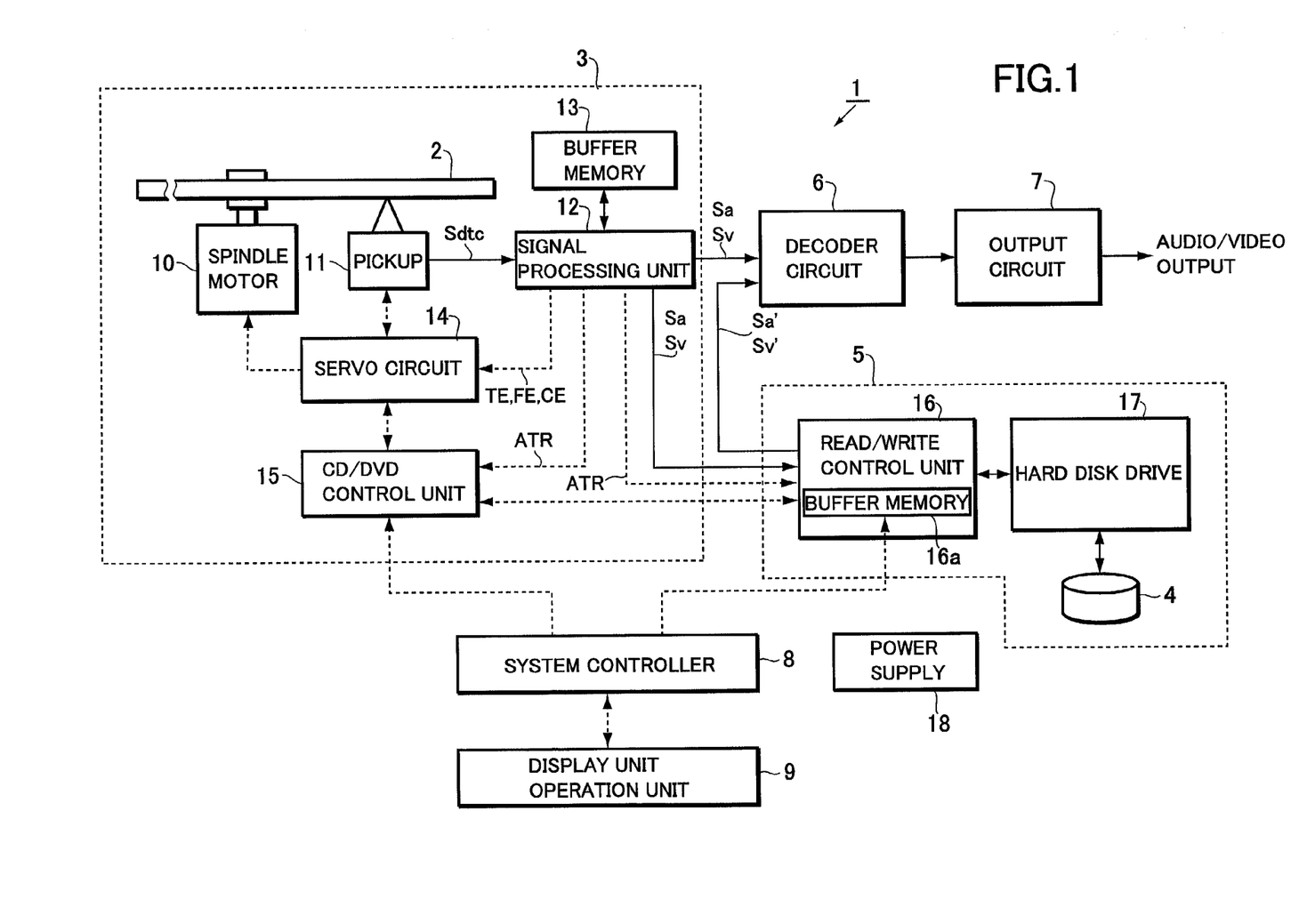
FIG. 1 is a block diagram illustrating the configuration of an information read/write apparatus according to an embodiment.

Now, the present invention will be explained below in more detail with reference to the accompanying drawings in accordance with the embodiments. FIG. 1 is a block diagram illustrating the configuration of an information read/write apparatus according to an embodiment.

Referring to FIG. 1, the information read/write apparatus 1 comprises a read unit 3 for reading program information stored on an information storage medium (hereinafter referred to as an optical disc) 2, such as a CD or DVD (Digital Versatile Disc), acting as a first information storage medium. The information read/write apparatus 1 also comprises a read/write unit 5 for writing program information or reading the program information stored on a hard disk 4 which acts as a second information storage medium, a decoder circuit 6, an output circuit 7, a system controller 8, and an operation unit 9 having a display unit.

The information read/write apparatus 1 is supplied with power from a predetermined power supply 18 to operate. When the information read/write apparatus 1 is a so-called car audio device which is incorporated into an automobile, the apparatus 1 is supplied with power from a power supply (or a car-mounted battery) 18 in response to the operational position of the starter key.

The read unit 3 comprises a spindle motor 10 for rotating the aforementioned loaded optical disc 2 at a predetermined linear speed, and a pickup 11 for optically reading information stored on the optical disc 2 to convert the information into an electrical signal Sdtc for output. The read unit 3 also comprises a signal processing unit 12, a buffer memory 13, a servo circuit 14, and a CD/DVD control unit 15.

The signal processing unit 12 is provided with a matrix circuit, a demodulator circuit, and a stream separator circuit, which are not illustrated. The aforementioned matrix circuit performs signal processing on the aforementioned electrical signal Sdtc delivered from the pickup 11. The matrix circuit thus generates error signals such as focus error signal FE and tracking error signal TE to supply these signals to the servo circuit 14, and also generates an RF signal. After the RF signal has been converted into digital data, the aforementioned demodulator circuit is adapted to demodulate and correct an error of the digital data in conformity with the data format of the optical disc 2. The aforementioned stream separator circuit then separates the resulting data into an audio stream Sa and a video stream Sv, which are in turn supplied to the decoder circuit 6 and a read/write control unit 16 which is provided in the read/write unit 5.

The signal processing unit 12 supplies the servo circuit 14 with sync error signal CE which results from the aforementioned demodulation and error correction processing as well as the CD/DVD control unit 15 and the read/write control unit 16, provided in the read/write unit 5, with management data ATR stored on the optical disc 2.

Incidentally, when the optical disc 2 is a CD, the management data ATR means TOC information stored on the lead-in area of the disc, Q channel sub-code data which is stored on the program area of the optical disc 2, as well as program information, etc. The TOC information, the Q channel sub-code data or the like serves to supply the CD/DVD control unit 15 and the read/write control unit 16 with information such as the condition for reading program information, a number provided for identifying program information (hereinafter referred to as a track number) and an index number, elapsed time and the like.

When the signal processing unit 12 performs the aforementioned demodulation and error correction processing and the stream separation processing, the buffer memory 13 stores temporarily the resulting data which is in turn rearranged into the predetermined order and then delivered to the decoder circuit 6.

The servo circuit 14 receives the aforementioned error signals, such as the focus error signal FE and the tracking error signal TE, and the sync error signal CE. Then, in response to an instruction from the CD/DVD control unit 15, the servo circuit 14 performs focus and tracking servo control on the pickup 11 as well as servo control on the rotational speed of the spindle motor 10.

When an audio stream Sa and a video stream Sv, on which the predetermined compression processing has been performed, are supplied from the signal processing unit 12, the decoder circuit 6 decodes these audio stream Sa and video stream Sv, which are in turn delivered to the output circuit 7. In addition, when an audio stream Sa' and a video stream Sv', on which the predetermined compression processing has been performed, are supplied from the read/write control unit 16, the decoder circuit 6 decodes these audio stream Sa' and video stream Sv', which are in turn delivered to the output circuit 7.

The output circuit 7 generates audio/video outputs to deliver the decoded audio data as digital data or to D/A convert the decoded audio data into an analog audio signal for output. The output circuit 7 also delivers the decoded video data as digital data or converts the decoded video data into a composite signal including the audio data for output.

Now, the configuration of the read/write unit 5 is explained below. The read/write unit 5 comprises the read/write control unit 16, a hard disk drive 17, and the hard disk 4 on which the hard disk drive 17 performs read and write operations. That is, the information read/write apparatus 1 is adapted such that the read unit 3 reads program information on the optical disc 2 and then writes the program information on the large-capacity hard disk 4. The apparatus 1 also reads program information stored on the hard disk 4 and then supplies the program information to the decoder circuit 6 and the output circuit 7. The apparatus 1 thereby provides the program information stored on the hard disk 4 to users.

The read unit 3 supplies an audio stream Sa or a video stream Sv to the read/write control unit 16, where the streams are converted (encoded) into data so as to be stored on the hard disk 4 and then supplied to the hard disk drive 17. For example, the audio stream Sa is converted by compression into data which conforms to the ATRAC3 standard or the like and then the resulting data is supplied to the hard disk drive 17. On the other hand, to read information stored on the hard disk 4, the read audio data which is supplied from the hard disk drive 17 is demodulated in accordance with the ATRAC3 standard or the like, and then the resulting audio stream Sa' and video stream Sv' are supplied to the decoder circuit 6.

Accordingly, the resulting audio stream Sa' and the video stream Sv' are decoded by the decoder circuit 6 and then converted by the output circuit 7 into an audio/video output for output.

Incidentally, the read/write control unit 16 also comprises a buffer memory 16a for temporarily storing data on which the aforementioned encoding processing or data demodulation processing is being performed, and then supplying the data to the hard disk drive 17 or the decoder circuit 6.

Although described later in more detail, consider a case where a read/write operation is interrupted due to power interruption or the like. In this case, the read/write control unit 16 also detects the interruption and generates status data indicative of the write status of the program information which has been processed at the time of interruption on the hard disk 4. The read/write control unit 16 then writes the status data on the hard disk 4 in conjunction with the track number of the program information. Then, upon restarting the read and write operations, the read/write control unit 16 retrieves the aforementioned status data stored on the hard disk 4 and the track number. Then, in response to the write status at the time of the interruption, the CD/DVD control unit 15 and the read/write control unit 16 automatically restart appropriate read and write operations in order to maintain the continuity of program information subsequent to the information which has been stored before the interruption.

The system controller 8 comprises a microprocessor (MPU) and executes a predetermined system program to thereby control the entire operation of the information read/write apparatus 1. The system controller 8 is also connected with the operation unit 9 having a display unit comprising a liquid crystal display device or the like. The system controller 8 is adapted to supply display data to the aforementioned display unit to thereby display a menu for urging the user to enter instructions for subsequent operations. The system controller 8 also allows the user to enter control contents of the operation keys provided on the operation unit 9, thereby controlling the entire operation of the information read/write apparatus 1 in accordance with the control content specified by the user.

The system controller 8 also provides control for performing read and write operations with the CD/DVD control unit 15 and the read/write control unit 16 in sync with each other.

The information read/write apparatus 1 is also provided with an auxiliary power supply, not illustrated, such as a large-capacity storage capacitor. When the system controller 8 detects the interruption of power from the power supply 18, the auxiliary power supply is adapted to sustain the operation of the information read/write apparatus 1 for a relatively short period of time.

Now, the operation of the information read/write apparatus 1, configured as such, will be explained with reference to the flowchart shown in FIGS. 2 and 3.

As a typical example of operation, described below is such a case where an interruption has occurred due to a power failure in the course of reading an audio stream, such as music, stored as program information on an optical disc 2 and writing the audio stream on a hard disk 4.

Figure 2:
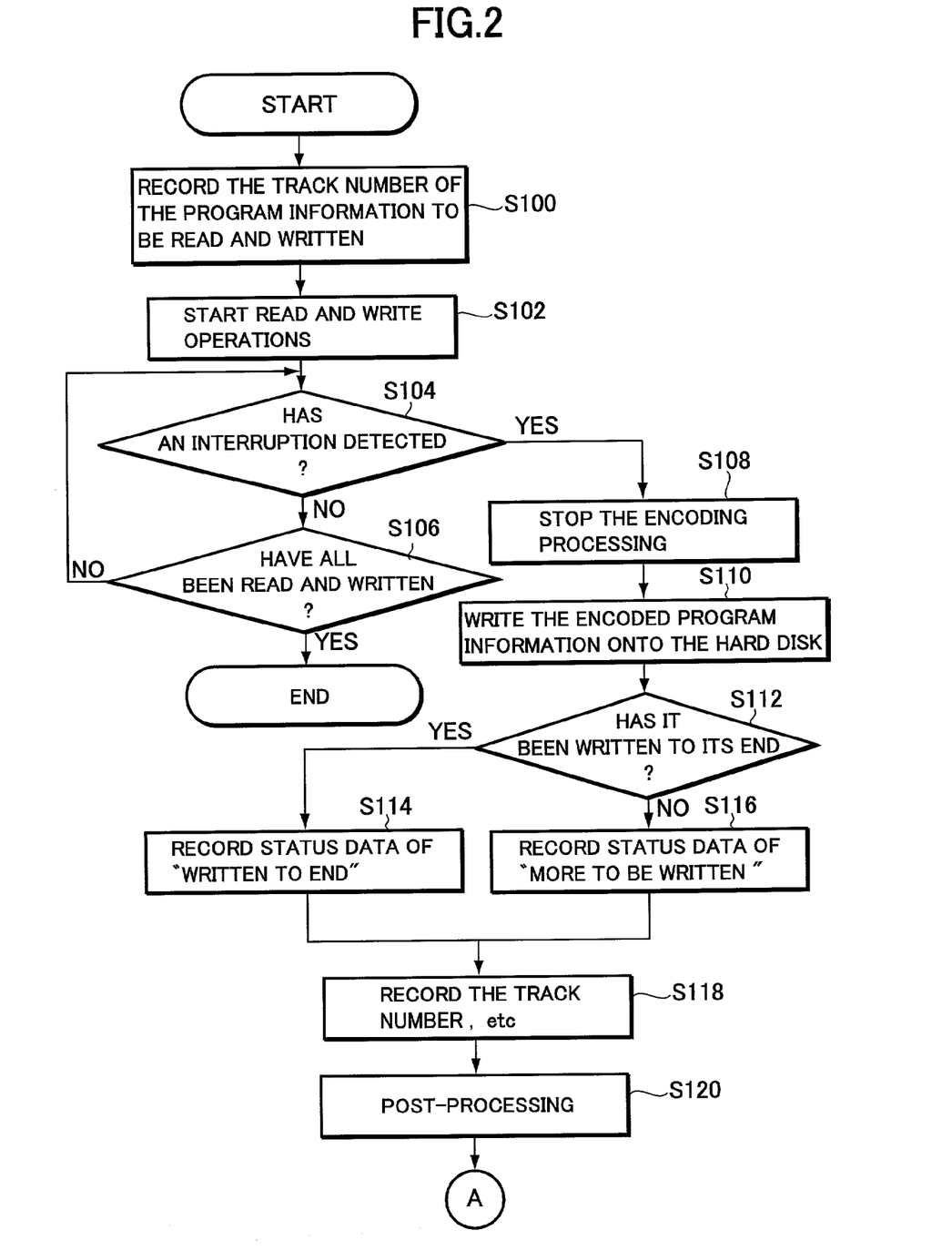
FIG. 2 is an explanatory flowchart illustrating the operation of the information read/write apparatus according to the embodiment.

Referring to FIG. 2, when the user loads the optical disc 2 to a predetermined clamp position, the read unit 3 reads management data ATR stored on the optical disc 2 and then retrieves a track number for identifying the program information of each music tune based on the management data ATR to display the track number on the aforementioned display unit. The user specifies the desired track number in response to the track numbers displayed, and it is then started to read and write the program information corresponding to the track number specified. On the other hand, when that program information on a plurality of tunes is stored on the optical disc 2, the user specifies the order of read and write operations as the order of track numbers and then provides an instruction to start the read and write operations, thereby allowing the program information to be read and written in the order of the track numbers specified. On the other hand, suppose that the user has given the instruction to start the read and write operations without specifying the track number. In this case, it is determined that the read and write operations should be performed on the program information of all music tunes, and then the program information is read and written in ascending order of the track numbers.

First, in step S100, the CD/DVD control unit 15 and the read/write control unit 16 store the track number of the program information to be read and written in their respective storage units (not shown).

The aforementioned read and write operations are then started in step S102. That is, the read unit 3 reads sequentially the program information (which should be read and written) stored on the optical disc 2, while the read/write unit 5 subsequently writes the program information (which has been read) on the hard disk 4. On the other hand, the CD/DVD control unit 15 and the read/write control unit 16 check the management data ATR (or the Q channel sub-code data for a CD) to thereby explicitly trace to what extent the program information of a certain track number has been read and written.

It is then detected in step S104 whether there is an interruption due to power failure or the like. If no interruption has occurred (if "NO"), the process proceeds to step S106, where it is checked whether all pieces of program information, which should be read and written, have been completely read and written. If the program information has not been completely read and written (if "NO"), the process continues the processing from step S104.

If all the pieces of program information which should be read and written are determined in step S106 to have been completely read and written (if "YES"), the process terminates the read and write operations.

If an interruption due to power failure or the like has been detected in the aforementioned step S104 (if "YES"), the process proceeds to step S108. In this step, while power is being supplied by the aforementioned auxiliary power supply, the encoding processing is stopped in the read/write control unit 16, and the program information which has already been encoded by then is also delivered from the buffer memory 16a and then written on the hard disk 4.

Furthermore, in step S112 where power is supplied by the aforementioned auxiliary power supply, it is determined whether the aforementioned program information stored previously has been written down to its end.

Figure 4:
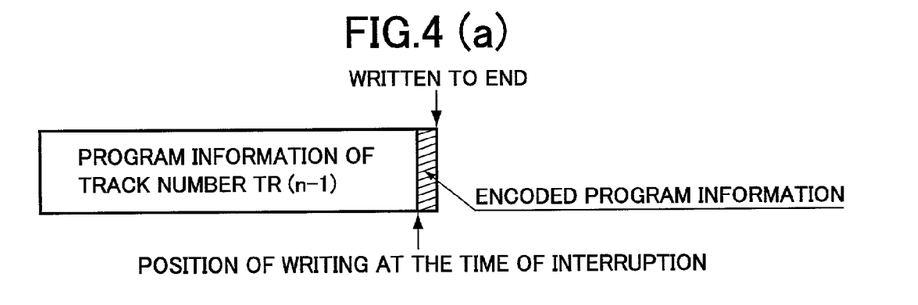
FIG. 4 is an explanatory view illustrating the write status at the time of occurrence of an interruption and the process for a read/write operation to be performed in accordance with the write status.

In other words, as shown in FIG. 4(a), suppose that an interruption has occurred in the course of writing the program information of track number TR(n-1) on the hard disk 4 and encoded program information has been written on the hard disk 4 while power is being supplied by the auxiliary power supply. It is then determined whether the program information of the track number TR(n-1) has been written down to its end. Incidentally, the Q channel sub-code data of the management data ATR is checked, thereby making it possible to determine whether the program information of the track number TR(n-1) has been written down to its end.

As shown in FIG. 4(a), if the program information of the track number TR(n-1) is determined to have been written down to its end (if "YES"), the process proceeds to step S114, where in the hard disk 4 is stored the status data "Written to end" indicating that the program information of the track number TR(n-1) has been completely written down to its end.

On the other hand, as shown in FIG. 4(b), if it is determined in step S112 that the encoded program information has been written on the hard disk 4 but not down to its end (if "NO"), the process proceeds to step S116. In step S116, in the hard disk 4 is stored the status data "More to be written" indicating that the program information of the track number TR(n-1) has not been written completely.

After the processing in step S114 or S116, information on the program information which has encountered the interruption, such as the aforementioned track number TR(n-1) and the name of its music tune, are then written on the hard disk 4 in step S118. Accordingly, since the aforementioned status data and the information on the program information which has encountered the interruption are written on the hard disk 4, at least the write status of the program information at the time of the interruption and its track number are stored as a history.

Figure 3:
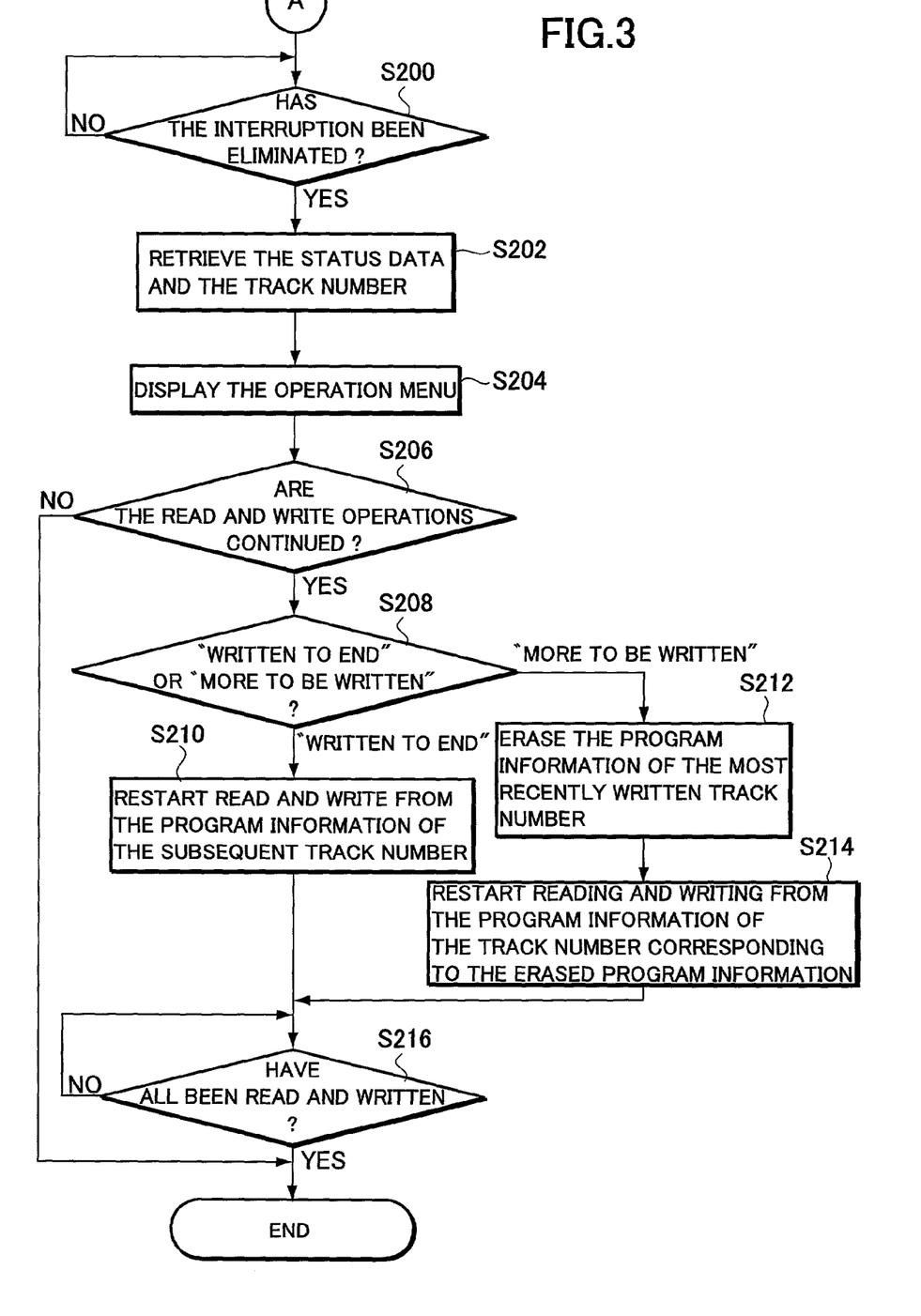
FIG. 3 is a further explanatory flowchart illustrating the operation of the information read/write apparatus according to the embodiment.

Then, in step S120, post-processing such as for stopping the operation of the read unit 3 and the read/write unit 5 is performed before the auxiliary power supply stops supplying power, and the process continues to the flow shown in FIG. 3.

Referring to FIG. 3, in step S200, the system controller 8 waits for the recovery of the power from the power supply 18, and then the process proceeds to step S202 after the power is recovered to thereby eliminate the interruption.

In step S202, the read/write control unit 16 retrieves the status data and the track number, stored on the hard disk 4 as the aforementioned history, from the hard disk 4. In the subsequent step S204, the system controller 8 displays the status data and the track number on the display unit of the operation unit 9 as well as the menu for urging the user to select and instruct whether to further continue the read and write operations.

Then, in step S206, if the user has instructed on the aforementioned menu not to continue the subsequent read and write operations (if "NO"), the process terminates the read and write operations. That is, the user can choose not to continue the read and write operations when the user desires to leave the read and written information unchanged on the hard disk 4 even after an interruption. The user may make the same choice when he or she desires to read the program information stored on the optical disc 2 from the very beginning and write it again on the hard disk 4.

In step S206, if the user has instructed to continue the read and write operations (if "YES"), the process proceeds to step S208, where the system controller 8 references the status data and the track number to thereby determine the write status of the program information having the most recently read and written track number. That is, it is determined whether the status data indicates the "Written to end" or "More to be written."

If the status data indicates "Written to end", the process proceeds to step S210, where the system controller 8 instructs the CD/DVD control unit 15 to restart the read operation in order to perform read and write operations from the beginning of the program information to be read and written subsequent to the most recently written track number. That is, as schematically shown in FIG. 4(c), when the most recently written track number indicates TR(n-1) and the track number to be subsequently read and written indicates TR(n), the program information of the track number TR(n) is read from the beginning. Simultaneously, the system controller 8 instructs the read/write control unit 16 to write the program information in the write area subsequent to that of the program information of the track number TR(n-1) which has been already written on the hard disk 4 before the interruption. This ensures the continuity between the program information of the track number TR(n-1) which has been already written down to its end before the interruption and the program information of the track number TR(n) which is to be read and written after the interruption has been eliminated.

On the other hand, if the status data indicates "More to be written", the process proceeds to step S212, where the system controller 8 instructs the read/write control unit 16 to erase the program information of the most recently read and written track number from the hard disk 4. For example, as schematically shown in FIG. 4(d), when the program information corresponding to the track number TR(n-1) has not been completely written down to its end, the program information which has been incompletely written is erased. In step S214, to perform read and write operations from the program information of the aforementioned erased track number, the system controller 8 then instructs the CD/DVD control unit 15 to restart the read operation and simultaneously instructs the read/write control unit 16 to restart the write operation. This ensures the continuity between the erased program information and the program information which has been properly written prior to the interruption.

Referring to the case of FIG. 4(*d*), suppose that the program information of track number TR(n-2) has been properly written on the hard disk 4 and then an interruption has occurred in the course of writing the program information of track number TR(n-1), of which status data indicates "More to be written." In this case, the incompletely written program information of track number TR(n-1) is erased from the hard disk 4 and it is then restarted to read and write the program information of track number TR(n-1) from its beginning. After the program information of the track number TR(n-1) has been completely read and written, the program information of the subsequent track number TR(n) is to be read and written. Consequently, the continuity is ensured among the program information of the track number TR(n-2) which has been already written before the interruption, the program information of the track number TR(n-1) which is read and written after the recovery from the interruption, and the program information of the track number TR(n).

As described above, read and write operations are subsequently performed in the aforementioned steps S208, S210 or in steps S208, S212, and S214. It is then determined in step S216 whether all pieces of program information which should be read and written have been completely read and written, and the process terminates the read and write operations if it has been determined to be true.

As described above in this embodiment, when an interruption occurs while the information read/write apparatus 1 is performing read and write operations, the write status at the time of the interruption is stored as status data in the hard disk 4. When the interruption has been eliminated, read and write operations are automatically restarted corresponding to the write status, thereby making it possible to perform the read and write operations ensuring the continuity between the program information which has been properly written before the interruption and the program information subsequent thereto without any cumbersome operation. In other words, if the write status of the most recently written program information at the time of the interruption indicates "Written to end", read and write operations are restarted from the beginning of the program information that is to be subsequently read and written. If the write status of the most recently written program information at the time of the interruption indicates "More to be written", the most recently written program information is erased from the hard disk 4 and then the program information corresponding to the erased program information is read from its beginning stored on the optical disc 2 and written on the hard disk 4. This makes it possible to perform read and write operations with the same high quality as in the case of no interruption without requiring any cumbersome operation.

Incidentally, such a case has been described above in which program information such as music is read and written, however, the present invention can also be applied to the case where a computer program or the like is read from the optical disc 2 and written onto the hard disk 4.

Such a case has also been described where the program information read from the optical disc 2 is written onto the hard disk 4, however, the present invention can also be applied to the case where there is provided drive means for writing program information on other information storage media such as an MD in order to write program information on an MD or the like instead of the hard disk 4. That is, program information is read and written on an MD while the management data ATR read from the optical disc 2 is being traced, and the management data ATR and the write status are recorded onto the MD when an interruption has occurred. This makes it possible to perform high-quality read and write operations to ensure the continuity of program information, in accordance with the management data ATR and the write status after the recovery from the interruption.

Such a case has also been described where the optical disc 2 is read as an information storage medium for read and write operations, however, the present invention also provides outstanding effects for "track read and write operations", "signal read and write operations" or the like.

That is, suppose that an interruption has occurred in the course of so-called track read and write operations where only one user-specified music tune is read and written. Upon restarting the read and write operations after the recovery from the interruption, it is automatically determined whether the status data indicates "Written to end" or "More to be written", and then the tune is read and written. This makes it possible to provide high-quality track read and write operations without requiring the user to go through a cumbersome operation.

Suppose also that an interruption occurs in the course of a read/write operation after the user has instructed the information read/write apparatus to operate in a so-called signal read and write mode for reading and writing only the first tunes stored on a plurality of optical discs. In this case, it is automatically determined whether the status data indicates "Written to end" or "More to be written", and then the tune is read and written. If the status data indicates "Written to end", the user is urged on the menu to load the next optical disc. If the status data indicates "More to be written", the user is urged on the menu to load the next optical disc after the first tune of the previously loaded optical disc has been read and written again. Accordingly, this makes it possible for the user to perform the signal read and write operations as if no interruption has occurred.

More specifically, the signal read and write operations are to select and automatically read and write only the first tune on each of a plurality of optical discs as described above. When the user selects and specifies the signal read and write mode and then loads a first optical disc into the read unit 3, the information read/write apparatus 1 writes the first tune of the optical disc on the hard disk 4. After the writing has been completed, the apparatus 1 ejects the optical disc and then urges the user on the menu to load the next optical disc. When the next optical disc has been loaded, the apparatus 1 writes the first tune of the next optical disc on the hard disk 4. In this way, the apparatus 1 continues this processing where a plurality of optical discs are loaded and ejected one after another to write only the first tune of each optical disc on the hard disk 4.

Suppose that an interruption occurs in the course of reading and writing the first tune of an optical disc in the signal read and write mode. In this case, if the status of the first tune of the optical disc which has encountered the interruption indicates "Written to end", the apparatus 1 ejects the optical disc to urge the user on the menu to load the next optical disc after the interruption has been eliminated. On the other hand, if the status of the first tune of the optical disc which has encountered the interruption indicates "More to be written", the apparatus 1 erases the first tune having the status of "More to be written" from the hard disk 4 and then reads and writes again the first tune of the optical disc to eject the optical disc and urge the user to load the next optical disc.

It is thus required to only load an optical disc even when an interruption occurs. This eliminates a cumbersome operation for specifying the signal read and write mode to perform read and write operations all over again on all the optical discs, thereby making it possible to improve operability.

Such an information read/write apparatus has been described which is provided with the read unit 3 for allowing optical discs to be loaded one by one. However, the operability of the user can also be improved upon occurrence of an interruption even in an information read/write apparatus provided with a read unit (having a so-called disc changer mechanism) which allows for simultaneously loading a plurality of optical discs.

That is, suppose that an interruption occurs in the course of reading and writing program information, such as music tunes, stored on a plurality of optical discs in the order in which the user has selected and specified. In this case, if the status of the program information on the optical disc which has encountered the interruption indicates "Written to end", it is restarted after the recovery from the interruption to perform read and write operations from the program information to be subsequently written. If the status of the program information on the optical disc which has encountered the interruption indicates "More to be written", it is restarted after the recovery from the interruption to read and write the program information and then the program information to be subsequently written. Accordingly, this makes it possible to perform read and write operations as if no interruption has occurred, thereby allowing for improving operability.

Furthermore, it is possible to apply the present invention not only to an interruption due to power failure but also to any interruptions resulting from various causes inside or outside the information read/write apparatus.

For example, the present invention can also be applied to any cases where an interruption occurs only at the read unit 3, where an interruption occurs only at the read/write unit 5, where an interruption occurs at both the read unit 3 and the read/write unit 5, or where an interruption which affects read and write operations occurs at portions other than the read unit 3 and the read/write unit 5.

In the case of an interruption, this embodiment is adapted to write the status data and the track number of the program information which has encountered the interruption onto a destination information storage medium or the hard disk 4. However, a rewritable nonvolatile memory may be incorporated in the read/write control unit 16. When an interruption has occurred, the memory may be used to store the aforementioned status data and track number in order to restart read and write operations, after the recovery from the interruption, in accordance with the status data and the track number stored in the memory. That is, it is possible to store the status data and the track number on storage means other than the destination information storage medium.

Furthermore, the information read/write apparatus has been described as a so-called purpose-built apparatus which performs reading and writing information, however, the present invention is not limited thereto. For example, it is also acceptable to provide a read/write process in the form of a computer program (a read and write procedure program) which is executable such as by a microprocessor and stored on an information storage medium such as a CD or DVD. In this case, the read/write process is employed to restart read and write operations in order to ensure the continuity of program information when an interruption has occurred as described above in the course of a read/write operation. The read and write procedure program may be installed and executed in an electronic device (such as a personal computer) having a microprocessor built therein.

In the form of an information storage medium, the present invention can be applied to a wide range of electronic devices which are provided with read and write device.

Furthermore, the aforementioned read and write procedure program may be not only provided in the form of an information storage medium but also transmitted over communication means such as the Internet to an electronic device such as a personal computer, where the program may be downloaded and executed.

As described above, when program information stored on a first information storage medium is read and an interruption has occurred in the course of writing the read program information onto a second information storage medium, the present invention is adapted to restart read and write operations, after the recovery from the interruption, according to the write status at the time of the interruption in order to ensure the continuity of program information. This makes it possible to provide read and write operations through a simple operation with the same high quality as in the case of no interruption. Furthermore, the write status at the time of the interruption is automatically determined and the processing for restarting read and write operations in order to ensure the continuity of program information is automatically performed, thereby making it possible to provide improved operability for the user.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information read and write apparatus comprising:
    read device for reading one or more pieces of program information stored on a first information storage medium; write device for writing said program information read from said first information storage medium onto a second information storage medium;
    power supply means for supplying an electric power from a main power source or an auxiliary power source to the read device and the write device;
    detector means for detecting an interruption of at least any one of a read operation of said read device and a write operation of said write device in the course of writing said program information by said write device, said interruption being caused due to an electric power failure of the main power source;
    determination means which operates when said detector means has detected the interruption, to supply an electric power from the auxiliary power source, to determine a write status of program information on said second information storage medium at the time of said interruption, and to store the write status sent from the detector means in a nonvolatile memory;
    control means for controlling said read device and said write device, upon restarting writing said program information by said write device and in response to the write status read from the nonvolatile memory when the electric power supply from the main power source is restored, to continue a write operation on said second information storage medium from the program information to be read subsequent to the program information at the time of said interruption or to perform a rewrite operation on said second information storage medium from said program information at the time of said interruption.

2. The information read and write apparatus according to claim 1, wherein said detector means detects an interruption due to a power failure at least at any one of said read device or said write device.

3. The information read and write apparatus according to claim 1, wherein said determination means determines the write status of whether the program information at the time of said interruption has been written to its end or incompletely.

4. The information read and write apparatus according to claim 3, wherein
when said determination means determines that the program information at the time of the interruption has been written to its end, said control means allows, upon continuing said write operation, said read device and said write device to continue a write operation from the program information to be read subsequent to the program information at the time of said interruption on said second information storage medium.

5. The information read and write apparatus according to claim 3, wherein
when said determination means determines that the program information at the time of said interruption has been written incompletely, said control means allows, upon performing said rewrite operation, said read device and said write device to erase the program information at the time of said interruption, having already been written on said second information storage medium, and perform a rewrite operation on said second information storage medium from the program information corresponding to said erased program information of the program information stored on said first information storage medium.

6. The information read and write apparatus according to claim 1, wherein said control means controls and thereby allows said write device to write information indicative of the write status determined by said determination means onto said second information storage medium.

7. An information read and write method for reading one or more pieces of program information stored on a first information storage medium and writing said program information onto a second information storage medium, comprising:
supplying an electric power from a main power source to a read device and a write device;
detecting an interruption of any one of said read operation and said write operation in the course of writing said program information onto said second information storage medium, said interruption being caused due to an electric power failure of the main power source;
supplying an electric power from an auxiliary power source when said interruption has been detected;
determining a write status of program information on said second information storage medium at the time of said interruption when said interruption has been detected and storing the write status in a nonvolatile memory; and
upon restarting writing said program information and in response to the write status read from the nonvolatile memory when the electric power supply from the main power source is restored, continuously performing a write operation on said second information storage medium from program information to be read subsequent to the program information at the time of said interruption or performing a rewrite operation on said second information storage medium from said program information at the time of said interruption.

8. The information read and write method according to claim 7, wherein
determining said write status is to determine the write status of whether the program information at the time of said interruption has been written to its end or incompletely,
when it is determined that the program information at the time of said interruption has been written to its end, said step of performing read and write operations in response to said write status continues a write operation on said second information storage medium from the program information to be read subsequent to the program information at the time of said interruption, and
when it is determined that the program information at the time of said interruption has been written incompletely, said step of performing read and write operations in response to said write status erases the program information at the time of said interruption, having been already written on said second information storage medium, and performs a rewrite operation on said second information storage medium from the program information corresponding to said erased program information of the program information stored on said first information storage medium.

9. A program storage medium storing a read and write procedure program to allow a computer to perform read and write operations for reading one or more pieces of program information stored on a first information storage medium and writing said program information onto a second information storage medium, said read and write procedure program comprising the procedure steps of:
supplying an electric power from a main power source to a read device and a write device;
detecting an interruption of any one of said read operation and said write operation, said interruption being caused due to an electric power failure of the main power source;
supplying an electric power from an auxiliary power source when said interruption has been detected;
determining a write status of program information on said second information storage medium at the time of said interruption when said interruption has been detected, and storing the write status in a nonvolatile memory; and
upon restarting said write operation and in response to said write status read from the nonvolatile memory when the electric power supply from the main power source is restored, continuously performing a write operation on said second information storage medium from program information to be read subsequent to the program information at the time of said interruption, or performing a rewrite operation on said second information storage medium from said program information at the time of said interruption.

* * * * *